United States Patent [19]

Masui et al.

[11] Patent Number: 5,297,290
[45] Date of Patent: Mar. 22, 1994

[54] METHOD AND APPARATUS FOR INTERRUPTION PROCESSING IN MULTI-PROCESSOR SYSTEM

[75] Inventors: Koji Masui; Masayuki Tanji, both of Hitachi, Japan

[73] Assignee: Hitachi, Ltd., Tokyo, Japan

[21] Appl. No.: 408,731

[22] Filed: Sep. 18, 1989

[30] Foreign Application Priority Data

Sep. 20, 1988 [JP] Japan .................................. 63-233426

[51] Int. Cl.[5] ...................... G06F 13/14; G06F 13/368
[52] U.S. Cl. ..................................... 395/725; 395/275; 395/325; 364/DIG. 1; 364/240.1; 364/241.2; 364/242.6
[58] Field of Search ... 364/200 MS File, 900 MS File, 364/DIG. 1, DIG. 2; 395/200, 275, 325, 725

[56] References Cited

U.S. PATENT DOCUMENTS

| | | | |
|---|---|---|---|
| 4,499,538 | 2/1985 | Finger et al. | 395/325 |
| 4,833,598 | 5/1989 | Imamura et al. | 395/650 |
| 4,920,486 | 4/1990 | Nielsen | 395/725 |

*Primary Examiner*—Thomas C. Lee
*Assistant Examiner*—John C. Loomis
*Attorney, Agent, or Firm*—Antonelli, Terry, Stout & Kraus

[57] ABSTRACT

An interruption signal from a common input/output device is coupled to all processors through a common bus, and each processor issues to the common bus its own interruption receipt acceptance or negation state and the respective processors watch and decide individually interruption receipt acceptance or negation states on the common bus of the individual processors. Only one of processors which are ready to accept the receipt of interruption is allowed to accept the receipt of an interruption signal from the common input/output device in accordance with a predetermined priority.

10 Claims, 2 Drawing Sheets

METHOD AND APPARATUS FOR INTERRUPTION PROCESSING IN MULTI-PROCESSOR SYSTEM

BACKGROUND OF THE INVENTION

This invention relates to a multi-processor system having a plurality of processors and more particularly to method and apparatus for interruption processing in a multi-processor system in which a common input/output device is coupled to a common bus and a plurality of processors can access the common input/output device.

In this type of multi-processor system, the receipt of an interruption from the common input/output device may be controlled in accordance with the following four well-known control schemes.

SCHEME 1

A specified one of a plurality of processors constituting the system is fixedly used as a processor capable of performing input/output processings and the specified processor receives all input/output interruptions from the common input/output device.

SCHEME 2

In this scheme, an input/output interruption from the common input/output device is transmitted to all processors, and one of the processors which first receives the interruption performs an interruption processing.

SCHEME 3

In this scheme, one of a plurality of processors which has issued an input/output request performs an interruption processing. The common input/output device memorizes the input/output request originator processor and communicates with this processor for interruption.

SCHEME 4

Individual processors inform a system controller of their states, and the system controller checks the processors for their states to specify a processor and supplies to the specified processor an interruption from the common input/output device.

The above schemes have disadvantages as follows.

SCHEME 1

In the event that the processor capable of performing the input/output processing becomes faulty and breaks down, the system breaks down inevitably. Further, since the processor capable of performing the input/output processing is fixed, this processor tends to cause a bottleneck in performance.

SCHEME 2

The processor first receiving the interruption to perform the interruption processing is not always in good condition for interruption processing, and so the overhead concomitant with the interruption processing might be increased.

SCHEME 3

When the input/output request originator processor is not in good condition for receiving an input/output interruption from the common input/output device, the commencement of interruption processing is delayed.

Further, a countermeasure is needed in case the input/output request originator processor becomes faulty and breaks down before receiving an input/output interruption.

SCHEME 4

In the event that the system controller per se becomes faulty, interruptions from the common input/output device can not at all be received. Further, interruption signals must be supplied individually to respective processors and therefore as the number of processors increases, the number of interruption signals to be delivered from the system controller is disadvantageously increased in proportion to the number of processors.

SUMMARY OF THE INVENTION

An object of the invention is to provide an interruption processing method and apparatus wherein a plurality of processors can decide individually on the acceptance or refusal of the receipt of an interruption so that the number of signal lines can be reduced and the apparatus can be immune to trouble.

According to the invention, to accomplish the above object, an interruption signal from an input/output device is coupled to all processors through a common bus, interruption receipt acceptance or refusal states issued from individual processors onto the common bus are watched and decided individually by the respective processors, and thereafter only one of the processors which are ready to accept the receipt of the interruption signal is allowed in accordance with a predetermined priority to accept the receipt of the interruption signal from the input/output device.

Since, in accordance with the invention, the interruption signal from the input/output device is coupled to all of the processors via the common bus, it is not necessary to increase the number of interruption signal lines as the number of processors increases. In addition, since all processor states are decided individually by the respective processors to allow only an interruption receipt acceptable processor to acknowledge an interruption signal, concentration of interruption processing on a specified processor can be avoided.

Furthermore, in the present invention, the receipt acceptance or refusal deciding ports are distributed redundantly and therefore, even in the event that the deciding port of one processor becomes faulty, a remaining processor can take charge of the interruption processing.

DESCRIPTION OF THE PREFERRED EMBODIMENTS

Figure 1:
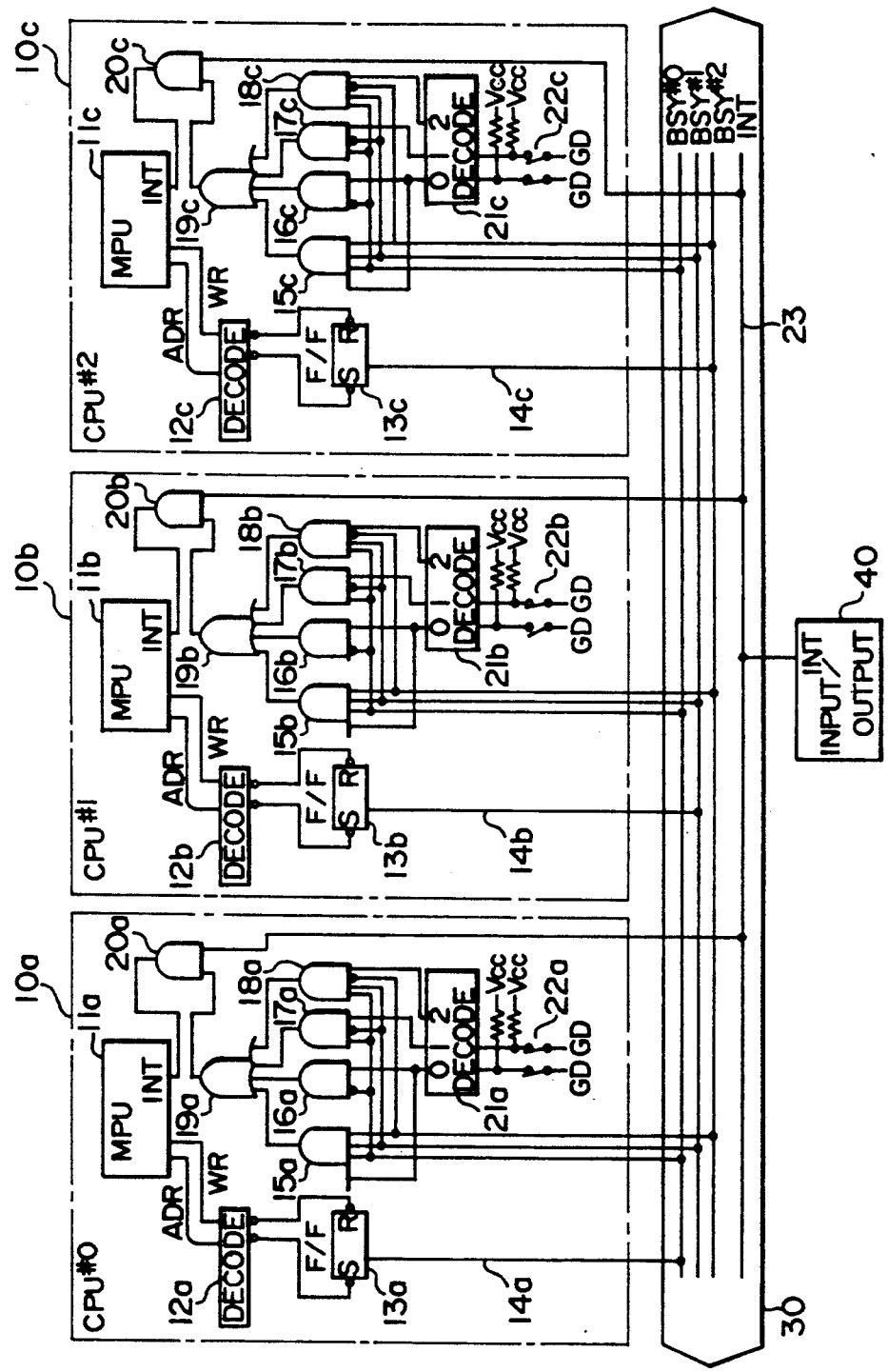
FIG. 1 is a circuit diagram of a multi-processor system according to an embodiment of the invention.

Referring to FIG. 1, there is illustrated an embodiment of a multi-processor system according to the invention. The system comprises three processors CPU#0 10a, CPU#1 10b and CPU#2 10c, a system bus 30 which is a common bus of the system, and a common input/output device 40. The respective CPU's are coupled to respective BUSY signal lines BUSY#0 14a, BUSY#1 14b and BUSY#2 14c of the system bus 30 and its interruption signal line INT 23 to which the input/output device 40 is also coupled. Signals on the lines will be designated hereinafter by the same reference characters as those designating the lines. BUSY signal 14a, 14b or 14c is used to indicate whether the individual CPU's are ready to accept or refuse the receipt of interruption. In addition to the above lines, the system bus 30 includes well-known control signal lines, such as address lines, data lines, and read/write lines which are not related directly to the present invention and will not be described herein. The respective processors issue individually the BUSY signals 14a, 14b and 14c which assume logic "1" representative of refusal of the receipt of interruption when the processor is busy and logic "0" representative of acceptance of the receipt of interruption, when the processor is idle. The BUSY signal may be replaced with a flag representative of an interruption inhibitive state of a microprocessor included in the processor, but in the present embodiment, the processor is preferably designed to issue the logic "1" when it has many jobs to be executed currently and is reluctant to receive any additional job, such as an interruption processing. Accordingly, each processor can adjust its own load by issuing the BUSY signal 14a, 14b or 14c.

Each of the processors includes a microprocessor (simply referred to as MPU hereinafter) 11a, 11b or 11c, address decoder 12a, 12b or 12c, a busy flip-flop 13a, 13b or 13c and an interruption receipt acceptance or refusal decider comprised of AND gates 15a, 16a, 17a, 18a and 20a, 15b, 16b, 17b, 18b and 20b or 15c, 16c, 17c, 18c and 20c and an OR gate 19a, 19b or 19c, a processor number decoder 21a, 21b or 21c and a processor number setting switch 22a, 22b or 22c. The MPU 11a, 11b or 11c delivers an address signal (ADR) and a write signal (WR) to the address decoder 12a, 12b or 12c so that when the MPU writes a specified address in the address decoder, the address decoder 12a, 12b or 12c operates to set/reset the busy flip-flop 13a, 13b or 13c which in turn delivers the busy signal 14a, 14b or 14c to the system bus 30. Different processor numbers uniquely assigned to the individual processors are respectively set in the processor number setting switches 22a, 22b and 22c. The set value of a processor number is delivered to the processor number decoder 21a, 21b or 21c to cause it to produce the logic "1" at its output terminal corresponding to the processor number. In this embodiment, "0, 0" is set in the processor number setting switch 22a of the CPU#0 10a and the processor number decoder 21a produces the logic "1" at its output terminal 0. Similarly, the processor number decoder 21b of the CPU#1 10b produces the logic "1" at its output terminal 1 and the processor number decoder 21c of the CPU#2 10c produces the logic "1" at its output terminal 2.

Assuming that all the CPU's are in the idle state, the BUSY signal 14a of the CPU#0 10a is logic "0" and its processor number decoder 21a produces the logic "1" at the output terminal 0, causing the AND gate 16a to deliver the logic "1" and consequently the OR gate 19a to produce the logic "1". Under this condition when the input/output device 40 issues an interruption signal to the interruption signal line 23, the AND gate 20a is enabled to produce the logic "1" for delivering the interruption from the input/output device 40 to the MPU 11a. After acknowledging the interruption, the MPU 11a executes an interruption processing program. In an instance where a plurality of input/output devices are coupled to the system bus 30, in accordance with the interruption processing program values of the interruption state registers of the respective input/output devices are examined individually to identify the input/output device which is issuing the interruption, an instruction for turning off the interruption signal 23 is then issued to the input/output device issuing the interruption and thereafter processings associated with that input/output device, for example, reading of error information and starting of the succeeding input/output operation, are carried out. If interruption signals 23 are issued simultaneously from a plurality of input/output devices, an interruption signal from one input/output device is turned off with interruption signals from the remaining input/output devices being still alive, so that the aforementioned processing may be completed by repeating it by the number of the input/output devices issuing interruptions. The operation of the interruption processing program is well known in the art and will not be described herein. In the CPU#1 10b, on the other hand, only the output terminal 1 of the processor number decoder 22b assumes the logic "1", with the result that the AND gates 16b and 18b keep producing the logic "0" no matter what logic states the remaining input terminals of these AND gates take and the AND gate 17b also produces the logic "0" by receiving the logic "0" of the BUSY signal 14a. Since the AND gate 15b also produces the logic "0", input signals applied to the OR gate 19b are all logic "0", disabling the OR gate 19b to produce the logic "0" and the interruption signal from the input/output device 40 is prevented from being delivered to the MPU 11b. In the CPU#2 10c, the delivery of the interruption signal is prevented in a similar manner.

It is now assumed that the CPU#0 10a is busy and the remaining CPU's are idle. Then, in the CPU#0 10a issuing the BUSY signal 14a of logic "1", only the output terminal 0 of the processor number decoder 21a assumes the logic "1" and the BUSY signals 14b and 14c are logic "0", with the result that all of the AND gates 15a, 16a, 17a and 18a are disabled to produce the logic "0", causing the OR gate 19a to produce the logic "0" and consequently preventing delivery of the interruption signal 23 from the input/output device 40 to the MPU 11a. On the other hand, in the CPU#1 10b issuing the BUSY signal 14b of logic "0", the BUSY signal 14a is logic "1" and the output terminal 1 of the processor number decoder 21b assumes the logic "1", with the result that the AND gate 17b is enabled to produce the logic "1" and consequently the OR gate 19b is also enabled to produce the logic "1", thereby permitting the interruption signal 23 to reach the MPU 11b. In the CPU#2 10c, as in the case where all of the processors are idle, the delivery of the interruption signal 23 to the MPU 11c is inhibited.

Finally, it is assumed that all of the processors are busy. Nominally, in this case, there is no room for performing interruption processings. However, in some kinds of interruption, for example, in an interruption which calls for fetching of the state of a plant, data will collapse unless the processor performs a processing for the interruption regardless of the presence or absence of room for processing and therefore, in such a case, at least one of the processors is required to perform the interruption processing. In this embodiment, the CPU#0 10a is designed to play the part of a processor for this purpose, so that when all of the BUSY signals 14a to 14c are logic "1", the AND gate 15a is enabled to produce the logic "1" which in turn enables the OR gate 19a to produce the logic "1", permitting delivery of the interruption signal 23 to the MPU 11a. In the remaining processors CPU#1 10b and CPU#2 10c, the output terminals 0 of the processor number decoders 21b and 21c always assume the logic "0" disable AND gates 15b and 15c to always produce the logic "0" and consequently, the delivery of the interruption signal 23 to the MPU's 11b and 11c is inhibited when all of the processors are busy.

In accordance with the present embodiment, since the individual processors are coupled in common to the input/output device to receive the interruption signal therefrom, a single interruption signal suffices regardless of the number of processors and since the individual processors independently decide whether to accept the receipt of the interruption by using state signals on the system bus, even in the event of a failure of any one of the processors, the acceptance or refusal of the receipt of the interruption can be decided and interruption processing can be carried out by only the remaining sound processors. Further, since a specified processor can accept the receipt of interruption even when all of the processors are busy, any interruption issued from the input/output device will never be overlooked.

In the present embodiment, the BUSY signal is used as the signal for deciding an the acceptance or refusal of the receipt of interruption. Alternatively, however, the individual processors may be designed to produce execution levels so that a processor having the lowest execution level or a specified execution level can be allowed to accept the receipt of interruption or the individual processors may be designed to produce operating rates of the associated MPU's so that a processor having the lowest operating rate can be allowed to accept the receipt of interruption. Further, a plurality of input/output devices may be coupled to the common interruption line, of the system bus. In addition, while the number of types of interruption signals is one in the present embodiments a plurality of interruption signals may be used depending on causes of interruption. In that case, each processor may include a plurality of interruption receipt acceptance or refusal deciders in compliance with the number of interruption signals to ensure that the interruption receipt acceptance or negation can be determined for each interruption signal.

Figure 2:
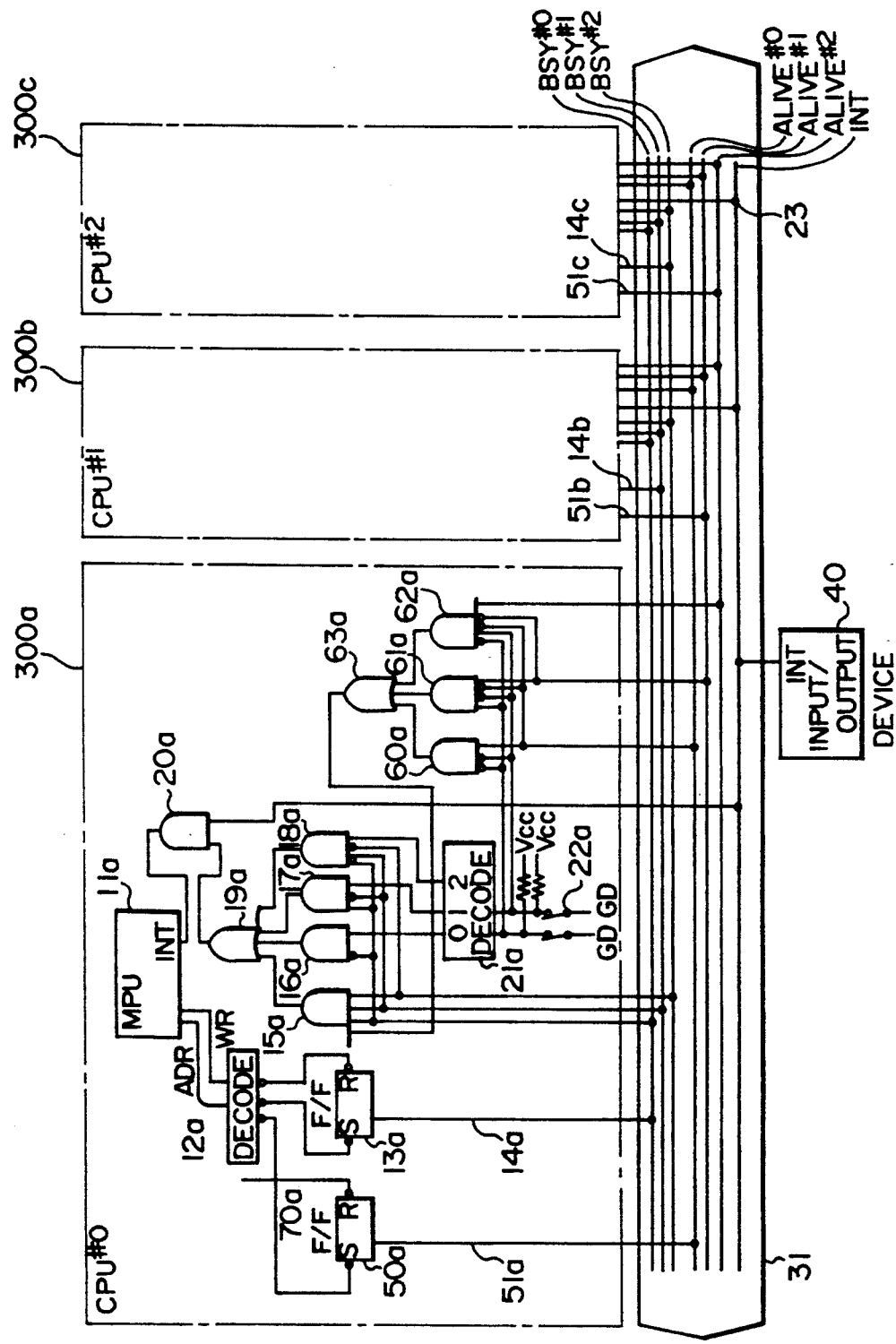
FIG. 2 is a similar diagram showing another embodiment of the multi-processor system according to the invention.

Referring to FIG. 2, there is illustrated a second embodiment of the multi-processor system according to the invention. In the second embodiment, the CPU, herein CPU#0 10a as a representative processor, additionally includes, as compared to the CPU#0 10a of the FIG. 1 multi-processor system, an alive/dead state flip-flop 50a adapted to issue an alive/dead state signal 51a (ALIVE signal) and an alive/dead state decider circuits having gates 60a, 61a, 62a and 63a. Also, the system bus 31 of this embodiment additionally includes ALIVE signal lines 51a, 51b and 51c which are coupled to the CPU's, respectively. In FIG. 2, the internal circuit of only the CPU#0 300a is illustrated and similar internal circuits of the remaining CPU#1 300b and CPU#2 300c are omitted. In the following description, reference numerals designating a circuit and signal for the CPU#0 are suffixed with "a", those for the CPU#1 with "b" and those for the CPU#2 with "c". Except for the additional provision of the circuits and signal lines, the construction of the FIG. 2 embodiment is identical to that of the FIG. 1 embodiment. Accordingly, the acceptance or refusal of the receipt of interruption is decided in accordance with states of the BUSY signals 14a, 14b and 14c through the same logic operation as that of the FIG. 1 embodiment and will not be described again. Therefore, a logic operation will be described wherein the alive state of the processor is decided in order that, when all of the CPU's are busy, only one processor is allowed to accept the receipt of an interruption from the input/output device 40 regardless of the interruption receipt acceptance or refusal state of its own processor.

Firstly, the power supply for the CPU's is started up and the MPU 11a, 11b or 11c of each CPU initializes and checks hardware, such as memories and registers included in the CPU. If the hardware is determined to be normal, a predetermined address is written in the decoder 12a, 12b or 12c which in turn sets the alive/dead state flip-flop (hereinafter simply referred to as ALIVE FF) 50a, 50b or 50c. The ALIVE FF's 50a to 50c are reset by error detection signals 70a to 70c, respectively. For example, the error detection signal 70a, 70b or 70c represents a signal which is generated when a parity error of a memory in the CPU is detected or when stoppage of the clock supplied to the MPU is detected. However, logic operation for error detection has no relation to the present invention and will not be described herein. When all of the CPU's are busy to issue BUSY signals 14a AND 14c of logic "1" and the CPU's are all alive or a valid state so as to issue the ALIVE signals 51a to 51c of logic "1", the AND gate 60a and OR gate 63a of the CPU#0 300a alone having its processor number setting switch 22a set with "0, 0" are enabled to produce the logic "1" and only the CPU#0 300a is allowed to accept the receipt of the interruption signal 23 from the input/output device 40. When only the CPU#0 300a is dead or in an invalid state indicating that only the ALIVE signal 51a is logic "0" and the remaining ALIVE signals are logic "1", the AND gate 60b of the CPU#1 300b is always disabled to produce the logic "0" and the AND gate 61b is enabled to produce the logic "1" on account of the output of the processor number setting switch 22b being "1, 0" and ALIVE signal 51b being logic "1". Accordingly, the OR gate 63b produces the logic "1" so that the AND gate 15b and OR gate 19b are enabled, thereby enabling the AND gate 20b so as to permit the CPU#1 300a to accept the receipt of the interruption signal 23. At that time, in the CPU#2 300c, the AND gates 60c, 61c and 62c and OR gate 63c are all disabled to produce the logic "0" on account of the ALIVE signal 51c being logic "1" and the output of the processor number setting switch 22c being "0, 1", causing the CPU#2 300c to negate the receipt of the interruption signal 23. Thus, in accordance with the present embodiment, even in the event that one or a plurality of CPU's become faulty and invalid when all the CPU's are busy, a CPU having the least processor number among the remaining sound CPU's operates, in accordance with the ALIVE signals indicative of the alive/dead states of the individual CPU's, to accept the receipt of the interruption signal 23 from the input/output device 40, preventing the interruption from the input/output device from being overlooked.

In the present embodiment, the processor capable of accepting the receipt of interruption when all of the processors are busy is fixedly served by a processor having the least processor number among the valid processors. Alternatively, however, such a processor may be determined as desired in a so-called round robin manner or in accordance with a program.

In a system wherein only a CPU which has started the input/output device is allowed to accept the receipt of interruption (end interruption) from the input/output device, when the CPU which has started the input/output device is executing a high-load job upon the generation of an interruption, either interruption processing or execution of the job has to be delayed even if another CPU is idle. On the contrary, in accordance with the invention, a CPU ready to accept the receipt of the interruption can play the part of processing the interruption to increase utilization efficiency of CPU's throughout the system and improve throughput.

In the present invention, an operating system receiving an input/output request from a user task first places the user task in a waiting condition, registers the waiting condition of the task in a task control table in the main memory and a task number of the started task in a device control table in the main memory, and starts the input/output device. Thereafter, an input/output operation is completed and the input/output device issues an end interruption. When the receipt of this end interruption is accepted by a CPU other than the CPU which has started the input/output device, the CPU accepting the receipt of the end interruption first executes an end interruption processing and then reads the task control table and device control table prepared by the CPU which has started the input/output device in order to re-start the registered user task and execute it in its own CPU. In this case, only one task control table and device control table necessary for management of the system should be prepared in the main memory common to the system. In this manner, even when a CPU other than the CPU which has started the input/output device accepts the receipt of the end interruption, execution of the necessary processing can be ensured.

As described above, according to the invention, the individual processors decide the interruption receipt acceptance or refusal independently by using state signals on the common bus and therefore even when one or a plurality of processors become faulty, the remaining sound processors can advantageously determine the interruption receipt acceptance or refusal to perform the interruption processing.

We claim:

1. A method for interruption processing in a multi-processor system, comprising the steps of:
    delivering an interruption signal from an input/output device simultaneously to a plurality of processors through a common bus;
    delivering from each processor to all processors a state signal indicating whether the processor issuing the state signal is in a state to accept an interruption signal;
    controlling each processor to determine individually within that processor and simultaneously with the other processors whether the remaining processors are in a state to accept the receipt of said interruption signal using the state signals received from all processors; and
    controlling only a single processor which is ready to accept the receipt of an interruption signal, from within that processor, to accept the receipt of said interruption signal in accordance with a predetermined priority;
    in response to detection in each processor that none of said processors are ready to accept the receipt of an interruption signal, accepting receipt of an interruption signal in accordance with a predetermined procedure in which one processor accepts an interruption signal regardless of the interruption receipt refusal state of that processor.

2. A multi-processor system having a plurality of processors and a common input/output device couples in parallel to a common bus so that said processors can independently access said common input/output device via said common bus, each of said processors comprising:
    state signal output means, couples to said common bus, for issuing to each of the other processors in parallel via said common bus a state signal indicating whether its own processor is ready to accept an interruption signal from said common input/output device;
    state signal input means for fetching state signals of at least said other processors from said common bus;
    interruption signal input means for receiving said interruption signal from said common input/output device through said common bus; and
    means, connected to said state signal input means and responsive to said state signal of its own processor and said state signals of said other processors, for controlling said interruption signal input means to accept or refuse the receipt of said interruption signal from said common input/output device;
    wherein each processor further includes means, responsive to detection that none of said processors are ready to accept the receipt of an interruption signal, for accepting receipt of an interruption signal in accordance with a predetermined procedure in which one processor accepts an interruption signal regardless of the interruption receipt refusal state of that processor.

3. A multi-processor system according to claim 2, wherein each processor has means for delivering a condition signal, indicating whether its own processor is operating normally, to the remaining processors through said common bus, and wherein said controlling means includes means responsive to said condition signal for controlling said interruption signal input means to enable only a processor normally operating to accept or refuse the receipt of an interruption signal.

4. A multi-processor system according to claim 2, wherein each processor has an interruption priority decision circuit, and wherein said controlling means in each processor comprises means responsive to said interruption priority decision circuit and said state signals for allowing only one processor to be enabled to accept the receipt of an interruption signal when said state signals indicate that a plurality of processors are enable to accept the receipt of said interruption signal.

5. A multi-processor system according to claim 4, wherein said controlling means in each processor includes a plurality of gates each assigned to a respective processor and each connected to said common bus to receive said state signals from all of said processors and to said interruption priority decision circuit to receive a priority signal indicating the priority of its assigned processor.

6. In a multi-processor system having a plurality of processor and a common input/output device coupled in parallel to a common bus, an improved common bus which allows said processors to independently access said common input/output device, comprising:
    an interruption signal line though which an interruption signal from said common input/output device is couples to each of said individual processors; and state signal lines, each assigned to a respective one of the individual processors and through which a state signal issued from a processor indicating whether that processor is ready to accept the receipt of an interruption signal is couples in parallel to the remaining processors, each of said processors receiving, from said common bus, state signals of the remaining processors and said interruption signal;

wherein each processor further includes means, responsive to detection that none of said processors are ready to accept the receipt of an interruption signal, for accepting receipt of an interruption signal in accordance with a predetermined procedure in which one processor accepts an interruption signal regardless of the interruption receipt refusal state of that processor.

7. A multi-processor system having a plurality of processors and a common input/output device coupled in parallel to a common bus so that each of said processors can independently access said common input/output device via said common bus, each of said processors comprising:

state signal output means, coupled to said common bus, for issuing to said common bus a state signal indicating whether its own processor is ready to accept an interruption signal from said common input/output device;

state signal input means for fetching state signals of the other processors from said common bus;

interruption signal input means for receiving said interruption signal from said common input/output device via said common bus; and means responsive to said state signal of its own processor and said state signals of said other processors for controlling its own processor to accept or refuse said interruption signal;

said common bus comprising:

an interruption signal line through which said interruption signal from said common input/output device is coupled to said interruption signal input means of each processor; and processor state signal lines, each coupled to said state signal output means of a respective processor and to the state signal input means of all other processors in parallel to carry state signals indicating whether individual processors are ready to accept the receipt of an interruption signal, whereby a desired processor is enabled by said controlling means therein in accordance with the states of said processors to accept the receipt of an interruption signal delivered from said common input/output device to said interruption signal line;

wherein each processor further includes means, responsive to detection that none of said processors are ready to accept the receipt of an interruption signal, for accepting receipt of an interruption signal in accordance with a predetermined procedure in which one processor accepts an interruption signal regardless of the interruption receipt refusal state of that processor.

8. A multi-processor system according to claim 7, wherein each processor has means for delivering a condition signal, indicating whether its own processor is operating normally, to the remaining processors through said common bus, and wherein said controlling means includes means responsive to said condition signal for controlling said interruption signal input means to enable only a processor normally operating to accept or refuse the receipt of an interruption signal.

9. A multi-processor system according to claim 7, wherein each processor has an interruption priority decision circuit, and wherein said controlling means in each processor comprises means responsive to said interruption priority decision circuit and said state signals for allowing only one processor to be enabled to accept the receipt of an interruption signal when said state signals indicate that a plurality of processors are able to accept the receipt of said interruption signal.

10. A multi-processor system according to claim 9, wherein said controlling means in each processor includes a plurality of gates each assigned to a respective processor and each connected to said common bus to receive said state signals from all of said processors and to said interruption priority decision circuit to receive a priority signal indicating the priority of its assigned processor.

* * * * *